(12) United States Patent
Römmele et al.

(10) Patent No.: US 9,736,170 B2
(45) Date of Patent: Aug. 15, 2017

(54) METHOD AND DEVICE FOR OPERATING A VEHICLE APPLICATION

(71) Applicant: CONTINENTAL AUTOMOTIVE GMBH, Hannover (DE)

(72) Inventors: Stefan Römmele, Kronberg/Taunus (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 6 days.

(21) Appl. No.: 14/434,289

(22) PCT Filed: Sep. 27, 2013

(86) PCT No.: PCT/EP2013/070195
§ 371 (c)(1),
(2) Date: Apr. 8, 2015

(87) PCT Pub. No.: WO2014/056731
PCT Pub. Date: Apr. 17, 2014

(65) Prior Publication Data
US 2015/0271185 A1    Sep. 24, 2015

(30) Foreign Application Priority Data
Oct. 10, 2012 (DE) .................. 10 2012 218 488

(51) Int. Cl.
*G06F 21/64* (2013.01)
*H04L 29/06* (2006.01)
(Continued)

(52) U.S. Cl.
CPC .............. *H04L 63/12* (2013.01); *G06F 21/64* (2013.01); *H04L 9/3247* (2013.01); *H04L 67/12* (2013.01)

(58) Field of Classification Search
CPC . G06F 21/64; H04L 9/32; H04L 9/006; H04L 63/12
See application file for complete search history.

(56) References Cited

U.S. PATENT DOCUMENTS 7,979,706 B1    7/2011 Case
8,314,718 B2   11/2012 Muthaiah et al.
(Continued)

FOREIGN PATENT DOCUMENTS

CN      102035874        4/2011
DE   102007053255 A1    5/2009
(Continued)

OTHER PUBLICATIONS

Dr. Hariharan Krishnan, "Verify-on-Demand"—A Practical and Scalable Approach for Broadcast Authentication in Vehicle Safety communication, Oct. 2, 2008, pp. 1-9.
(Continued)

*Primary Examiner* — David Pearson
(74) *Attorney, Agent, or Firm* — Cozen O'Connor

(57) ABSTRACT

In a method, each received vehicle-to-X message is at least partly forwarded to at least one application of a vehicle depending on specified information of the vehicle-to-X message (N), the vehicle-to-X message comprising a digital signature. Digital signatures of the vehicle-to-X messages relevant to the decision that a specified action of the application should be carried out are validated depending on a decision signal provided in response to the vehicle-to-X messages being forwarded to the at least one application and which represents an assertion as to whether the vehicle-to-X messages comprise data causing the action to be carried out. A signal is provided depending on a result of the validation of the digital signatures, the signal representing a credibility of the vehicle-to-X messages relevant to the decision.

7 Claims, 3 Drawing Sheets

(51) Int. Cl.
   *H04L 29/08*   (2006.01)
   *H04L 9/32*    (2006.01)

(56) References Cited

U.S. PATENT DOCUMENTS

| | | | |
|---|---|---|---|
| 8,909,927 | B2 | 12/2014 | Falk et al. |
| 9,099,001 | B2 | 8/2015 | Stahlin et al. |
| 2011/0080302 | A1 | 4/2011 | Mathaiah et al. |
| 2011/0140968 | A1* | 6/2011 | Bai ................. G01S 5/0072 342/454 |
| 2011/0238997 | A1* | 9/2011 | Bellur ............. H04L 63/1458 713/176 |
| 2011/0304425 | A1* | 12/2011 | Iyer ................. H04L 9/3247 340/5.8 |
| 2013/0218415 | A1* | 8/2013 | Stahlin ............ B60W 10/18 701/41 |
| 2014/0006615 | A1* | 1/2014 | Karnik ............. H04L 63/0227 709/225 |
| 2014/0020098 | A1* | 1/2014 | Stahlin ............ G08G 1/163 726/22 |

FOREIGN PATENT DOCUMENTS

| | | |
|---|---|---|
| DE | 102010046843 A1 | 6/2011 |
| DE | 102010041147 A1 | 3/2012 |
| DE | 102012204880 A1 | 10/2012 |
| WO | WO 2012/038185 | 3/2012 |

OTHER PUBLICATIONS

Office Action dated Jan. 4, 2017 which issued in the corresponding Chinese Patent Application No. 201380052680.5.

* cited by examiner

METHOD AND DEVICE FOR OPERATING A VEHICLE APPLICATION

CROSS-REFERENCE TO RELATED APPLICATIONS

This is a U.S. national stage of application No. PCT/EP2013/070195, filed on Sep. 27, 2013, which claims priority to the German Application No. DE 10 2012 218 488.0 filed Oct. 10, 2012, the content of both incorporated herein by reference.

BACKGROUND OF THE INVENTION

1. Field of the Invention

The invention relates to a method and a device for operating a vehicle application and to a vehicle system comprising the device and the application.

2. Related Art

In vehicle-to-vehicle communication and vehicle-to-infrastructure communication, vehicles communicate with other vehicles or vehicles communicate with infrastructure facilities. This communication is also referred to overall as vehicle-to-X communication (V2X communication). Such V2X systems are used, in particular, to interchange data for use in a driving assistance system and/or a safety system of vehicles. One problem is that of ensuring the necessary data authenticity of the transmitted vehicle-to-X information since this information may also be used as a basis for intervening in the vehicle control. An item of incorrect or at worst even falsified vehicle-to-X information may therefore have serious consequences and must be reliably identified as untrustworthy.

SUMMARY OF THE INVENTION

An object of the invention is to provide a method and a corresponding device for operating an application for a vehicle and a vehicle system which contribute to increasing the efficiency and/or reliability of execution of the application in the vehicle.

According to a first and a second aspect, the invention is distinguished by a method and a corresponding device for operating at least one application for a vehicle. In this case, a respective received vehicle-to-X message is at least partially forwarded to the at least one application on the basis of a predefined item of information in the vehicle-to-X message. The vehicle-to-X message comprises a digital signature in this case. On the basis of a decision signal provided in response to the forwarding of the vehicle-to-X messages to the at least one application and represents a statement of whether the vehicle-to-X messages comprise data that causes a predefined action of the application to be carried out, the digital signatures of the vehicle-to-X messages relevant to the decision as to whether the action is intended to be carried out are validated. Furthermore, on the basis of a result of the validation of the digital signatures, a signal is provided, which signal is representative of the reliability of the vehicle-to-X messages which are relevant to the decision.

This has the advantage that a public key infrastructure (PKI) can be used for the vehicle-to-X communication. Cryptographic algorithms may be used.

The vehicle-to-X messages each have a digital signature. It is particularly advantageous for the respective applications to decide whether a vehicle-to-X message is used, and the vehicle-to-X message can be validated on the basis of whether the received vehicle-to-X message is actually relevant to the vehicle. This has the advantage that the digital signatures of all received vehicle-to-X messages need not be validated. This can save computing power and can reduce production costs for a security device that is designed to validate the digital signatures. This can also contribute to increasing the reliability with which the trustworthiness of the vehicle-to-X messages is discerned, since more computing power can be used to check them more quickly and/or more accurately therefor.

The respective application for the vehicle may comprise a driving assistance system and/or a safety system and/or a comfort system of the vehicle. In this case, the respective action may comprise, in particular, a respective vehicle function that can be discerned by a vehicle user, for example signaling of information for a driver, signaling of a warning signal, intervention in the driving dynamics of the vehicle and so on.

In one advantageous refinement of the first and second aspects, the vehicle-to-X messages that are relevant to the decision are validated and the signal is provided before the predefined action of the application is carried out, and the carrying-out of the predefined action of the application is started on the basis of the signal. This advantageously makes it possible to validate and therefore check the trustworthiness of the vehicle-to-X messages that are relevant to the decision before the predefined action is carried out. This can be advantageously used for actions which relate, in particular, to the safety of the vehicle.

In another advantageous refinement according to the first and second aspects, the vehicle-to-X messages that are relevant to the decision are validated and the signal is provided while the predefined action is being carried out, and the carrying-out of the at least one predefined action of the application is stopped on the basis of the provided signal. This advantageously makes it possible to already validate and therefore check the trustworthiness of the vehicle-to-X messages that are relevant to the decision while the predefined action is being carried out. This can be advantageously used for actions that are very time-critical and require a fast response.

In another advantageous refinement according to the first and second aspects, an urgency is assigned to the predefined action and, on the basis of the urgency of the action, the vehicle-to-X messages relevant to the decision are validated and the signal is generated either before the predefined action of the application is started or while the predefined action of the application is being carried out. The assignment of the urgency can be used to easily predefine which of the actions are very time-critical and which are not. This enables a simple decision as regards whether the validation should be carried out before the respective action is carried out or while the action is being carried out.

In another advantageous refinement according to the first and second aspects, the urgency is predefined. This makes it possible to easily evaluate the respective urgency for the respective action and therefore enables a very quick decision as regards whether the validation should be carried out before the respective action is carried out or while the action is being carried out.

In another advantageous refinement according to the first and second aspects, the urgency is determined on the basis of at least one of the vehicle-to-X messages relevant to the decision. This has the advantage that the urgency can be determined promptly. The respective vehicle-to-X message relevant to the decision may comprise useful data which predefine a possible response time for carrying out the predefined action, for example useful data that represent a period to a collision (time-to-collision, TTC).

In another advantageous refinement according to the first and second aspects, the validation is considered to be concluded and the signal is provided as soon as one of the vehicle-to-X messages that are relevant to the decision is classified as being unreliable. This can advantageously keep a period for the validation short. As soon as one of the vehicle-to-X messages that are relevant to the decision is classified as being untrustworthy and therefore as unreliable, the validation can be aborted and the carrying-out of the respective action is not started or is stopped.

In another advantageous refinement according to the first and second aspects, the vehicle-to-X messages that are relevant to the decision are validated on a random basis if a total number of vehicle-to-X messages that are relevant to the decision exceeds an upper limit value. This advantageously makes it possible to quickly validate the vehicle-to-X messages that are relevant to the decision. This can be used with particular advantage if the total number of vehicle-to-X messages that are relevant to the decision is very large, for example in the case of a traffic jam warning transmitted by a multiplicity of vehicles.

In another advantageous refinement according to the first and second aspects, on the basis of a number of vehicle-to-X messages received in a predefined period of time, the digital signature of one or more specific vehicle-to-X messages is validated before it/they is/are respectively assigned to the at least one application, the respective vehicle-to-X message being classified as a specific vehicle-to-X message on the basis of at least one predefined criterion. This can be advantageously used if a computing capacity of the security device, which is designed to validate the digital signals, is not used completely or is not used very heavily. In this case, the digital signatures of these specific vehicle-to-X messages can already be validated before they are assigned to a respective application and before they are classified as being relevant to the decision. This makes it possible for the respective specific vehicle-to-X message to no longer have to be validated if it is used for a decision as regards whether the respective predefined action is carried out.

In another advantageous refinement according to the first and second aspects, if a plurality of decision signals are provided at the same time or within a predefined period of time, an action priority is respectively determined for the respective actions on the basis of predefined rules, and the respective vehicle-to-X messages for the actions that are relevant to the decision are validated on the basis of the respectively determined action priorities. This advantageously makes it possible, if a plurality of applications decide at the same time or virtually at the same time that a predefined action should be carried out, to determine, on the basis of the respective action priorities, which of the actions are actually intended to be carried out and/or the order in which the respective actions are carried out.

According to a third aspect, the invention is distinguished by a vehicle system comprising a device according to the second aspect and a predefined application for the vehicle, the application being configured to decide, on the basis of the vehicle-to-X messages at least partially forwarded to the application, whether at least one predefined action of the application should be carried out. The application is also configured to provide, for the device, the decision signal representative of the fact that the vehicle-to-X messages comprise data that causes a predefined action of the application to be carried out. The application is also configured to control the carrying-out of the at least one predefined action on the basis of the signal which is generated by the device and is representative of the reliability of the vehicle-to-X message which is relevant to the decision.

Advantageous refinements of the first and second aspects also apply to the third aspect.

BRIEF DESCRIPTION OF THE DRAWINGS

Exemplary embodiments of the invention are explained below with reference the schematic drawings, in which.

Elements having the same design or function are provided with the same reference symbols throughout the figures.

DETAILED DESCRIPTION OF THE PRESENTLY PREFERRED EMBODIMENTS

Figure 1:
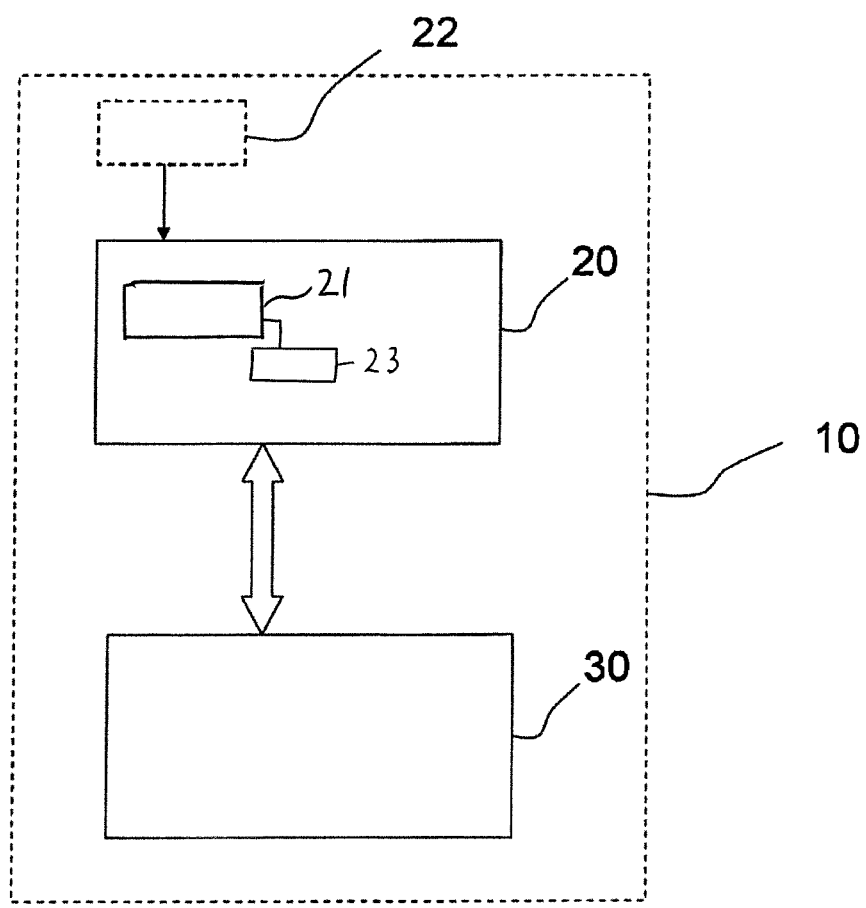
FIG. 1 shows a block diagram of a vehicle system.

FIG. 1 shows an exemplary embodiment of a vehicle system 10.

The vehicle system 10 comprises an application 30 for a vehicle and a device 20 for operating the application 30. In this exemplary embodiment, a communication device 22 is assigned to the device 20. Alternatively, the device 20 may comprise the communication device 22.

The device 20 may comprise a specific control apparatus 21 of the vehicle or a central computing unit 21 of the vehicle. The device 20 is coupled to the communication device 22 by signaling. The communication device 22 is configured to receive predefined vehicle-to-X messages N from other vehicles and/or infrastructure facilities in a predefined environment of the vehicle. The vehicle-to-X messages N comprise useful data and security data. The vehicle-to-X messages N comprise a digital signature. This makes it possible to check the trustworthiness of the vehicle-to-X message N. Calculation of the digital signature may be based on an elliptical curve cryptographic algorithm, for example.

The application 30 comprises a driver assistance system, for example. Alternatively or additionally, the application 30 may comprise a safety system of the vehicle and/or a comfort system of the vehicle. The application 30 is configured to decide, on the basis of the vehicle-to-X messages N at least partially forwarded to the application 30, whether at least one predefined action of the application 30 should be carried out.

The application 30 is also configured to provide, for the device 20, a decision signal D which is representative of the fact that the vehicle-to-X messages N comprise data which cause a predefined action of the application 30 to be carried out.

The application 30 is also configured to control the carrying-out of the at least one predefined action on the basis of the signal S which is generated by the device 20 and is representative of the reliability of the vehicle-to-X message N_rel relevant to the decision.

The device 20 may be configured, for example, to buffer and identify a respective copy of the vehicle-to-X message N. The application 30 may be configured to signal to the device 20 which vehicle-to-X messages N are relevant to the decision for the respective action, for example using this identification, with the result that the device 20 can validate the signatures of the vehicle-to-X messages N_rel relevant to the decision for the respective action.

Figure 2:
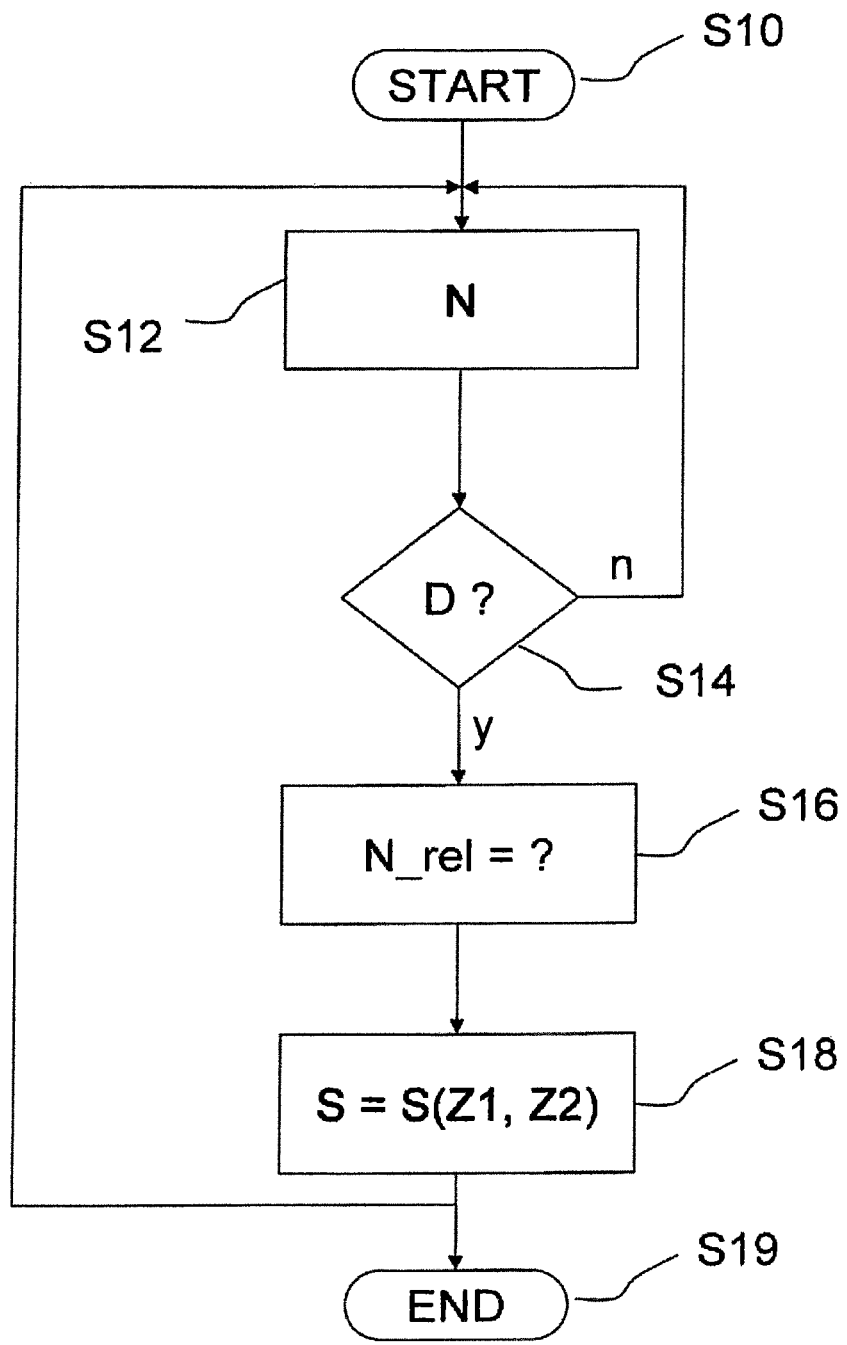
FIG. 2 shows an exemplary flowchart for a first program for operating an application.

FIG. 2 shows an exemplary flowchart for a first program for operating an application 30 for a vehicle. The device 20 for operating the application 30 for the vehicle comprises the computing unit 21 and a program memory 23, for example, and is designed to execute the first program.

In the flowchart shown in FIG. 2, the first program is started in a step S10. The first program can be started with activation of the vehicle, for example.

In a step S12, a respective item of predefined information in the respectively received vehicle-to-X message N is evaluated and the vehicle-to-X message N is at least partially forwarded to the at least one application 30 on the basis of the predefined information in the vehicle-to-X message N. In this case, the vehicle-to-X message N comprises a digital signature.

A step S14 detects whether a decision signal D is provided by the at least one application 30. A plurality of decision signals D may also be provided or detected by a plurality of applications 30 at the same time or at approximately the same time.

In a step S16, on the basis of the respective decision signal D which is provided in response to the forwarding of the vehicle-to-X messages N to the at least one application 30 and represents a statement of whether the vehicle-to-X messages N comprise data that causes a predefined action of the application 30 to be carried out, the digital signatures of the vehicle-to-X messages N_rel relevant to the decision as regards whether the action is intended to be carried out are validated.

In this case, the validation comprises, in particular, a check in order to determine whether the vehicle-to-X message N_rel relevant to the decision is trustworthy on the basis of the digital signature.

If step S16 determines that the vehicle-to-X messages N_rel relevant to the decision are trustworthy, a control signal having a first state Z1 is generated and output in a step S18, for example, the first state being representative of the fact that the vehicle-to-X messages N_rel relevant to the decision are sufficiently reliable and that the predefined action of the application 30 can be carried out.

If step S16 determines that the vehicle-to-X messages N_rel relevant to the decision are untrustworthy, the control signal having a second state Z2 is generated and output in step S18, for example, the second state being representative of the fact that the vehicle-to-X messages N_rel relevant to the decision are not sufficiently reliable and that the predefined action of the application 30 should not be carried out.

After step S18, the first program is preferably continued in step S12. The program can be ended in a step S19.

In this case, provision may be made for an urgency to be assigned to the predefined action, and for the vehicle-to-X message N_rel relevant to the decision to be validated and for the signal S to be generated on the basis of the urgency of the action.

If, for example, the action has a low or medium urgency, the vehicle-to-X message N_rel relevant to the decision can be validated and the signal S can be provided before the predefined action of the application 30 is carried out. The carrying-out of the predefined action of the application 30 is started or is not started on the basis of the signal S.

In contrast, if the action has a high urgency, the vehicle-to-X message N_rel relevant to the decision can be validated and the signal S can be provided while the predefined action is being carried out. The carrying-out of the at least one predefined action of the application 30 is either stopped or continues to be carried out on the basis of the provided signal S. This can be advantageously used for time-critical actions that require the fastest possible response and cannot wait for several milliseconds for the validation. Such a time-critical action may comprise, for example, activation of a warning light and/or priming of the brakes. The validation is started at the same time as or at approximately the same time as the start of the action.

In this case, the urgency of the respective predefined action may be predefined or may be determined on the basis of at least one of the vehicle-to-X messages N_rel relevant to the decision.

In particular, if the vehicle-to-X messages N_rel relevant to the decision are validated gradually and/or in order, provision may also be made for the validation to already be considered to be concluded and for the signal S to be provided as soon as one of the vehicle-to-X messages N_rel relevant to the decision is classified as being unreliable.

If there are a very large number of vehicle-to-X messages N_rel relevant to the decision for the respective action, provision may also be made for a random sample to be respectively taken from the set of vehicle-to-X messages N_rel relevant to the decision for this action. If the validation of the random sample is successful, for example, the action is carried out. The next random sample is verified in a predefined next time step. This operation is repeated until the application 30 has ended the action or the application 30 stops.

If a plurality of decision signals D are provided at the same time or within a predefined period of time, provision may also be made for an action priority to be respectively determined for the respective action on the basis of predefined rules, and for the respective vehicle-to-X messages N_rel relevant to the decision for the actions to be validated on the basis of the respectively determined action priorities.

Figure 3:
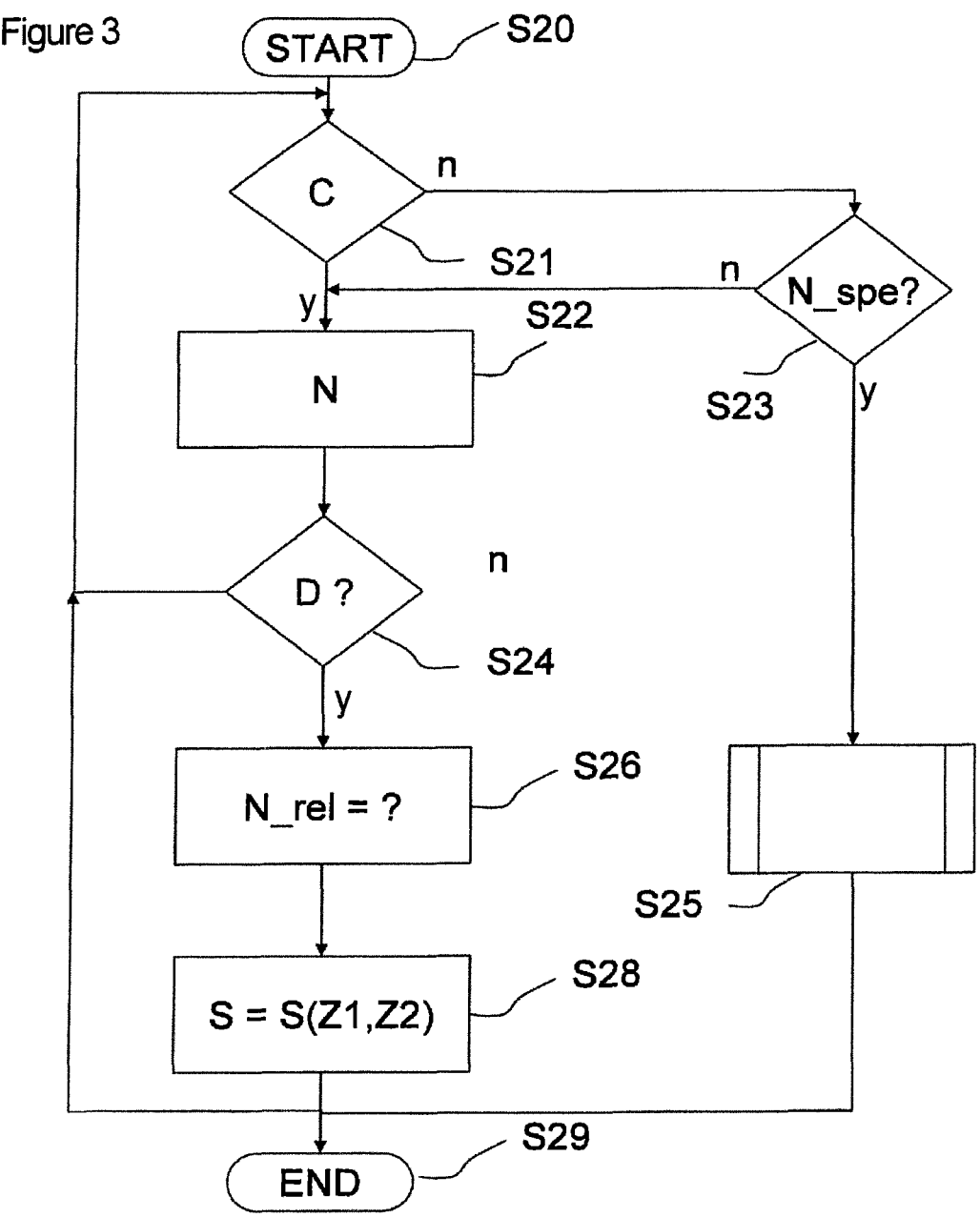
FIG. 3 shows an exemplary flowchart for a second program for operating the application.

FIG. 3 shows an exemplary flowchart for a second program for operating an application 30 for a vehicle. The device 20 is configured to execute the second program in addition or as an alternative to the first program.

In this case, program steps S20, S22, S24, S26, S28 and S29 of the second program correspond to program steps S10 to S19, respectively, of the first program.

In contrast to the first program, a query is effected in order to determine how large the number of received vehicle-to-X messages N is and an associated check of a computing workload of the device 20 is carried out in a step S21 in the second program. If the device 20 has sufficient computing capacity C, the digital signature of one or more specific vehicle-to-X messages N_spe is validated in a step S23 before it is respectively assigned to the at least one application 30. If the validation of the respective specific vehicle-to-X message N_spe reveals that the message is trustworthy, the respective specific vehicle-to-X message N_spe is at least partially forwarded to the respective application 30 in a step S25 on the basis of the predefined information. In this case, the application 30 is designed to suitably evaluate this trustworthy specific vehicle-to-X message N_spe.

In this case, the respective vehicle-to-X message N is classified as a specific vehicle-to-X message N_spe on the basis of at least one predefined criterion. The classification as a specific vehicle-to-X message N_spe can be carried out, for example, using the following criteria:

rank, that is to say a rank of the vehicle-to-X messages N is determined during preprocessing and the vehicle-to-X messages N are classified as a specific vehicle-to-X message N_spe on the basis of this rank;

distance, that is to say the vehicle-to-X message N that signals the shortest distance between the other vehicle and the vehicle is classified as a specific vehicle-to-X message N_spe;

time-to-collision (TTC), that is to say the vehicle-to-X message N which signals the shortest time-to-collision is classified as a specific vehicle-to-X message N_spe;

history, that is to say the vehicle-to-X messages N that are transmitted periodically and were already of interest and/or relevant to the decision during a previous cycle are classified as specific vehicle-to-X messages N_spe;

flags, that is to say the vehicle-to-X messages N that have a special identification, for example ambulance or emergency braking, are classified as specific vehicle-to-X messages N_spe;

message type, that is to say the vehicle-to-X messages N are classified as specific vehicle-to-X messages N_spe on the basis of their message type; possible message types in this case are SPaT (signal phase and timing), DENM (decentralized environmental notification message) and CAM (cooperative awareness messages). In particular, an order of evaluation may also be predefined on the basis of the message type.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating at least one application (30) for a vehicle having a communication device configured to receive predefined vehicle-to-X messages (N) from other vehicles, comprising:
   at least partially forwarding a respective received vehicle-to-X message (N) to the at least one application (30) on the basis of a predefined item of information in the received vehicle-to-X message (N), the vehicle-to-X message (N) comprising a digital signature;
   on the basis of a decision signal (D) provided in response to forwarding of vehicle-to-X messages (N) to the at least one application (30) and which represents a statement of whether the vehicle-to-X messages (N) include data that causes a predefined vehicle action of the application (30) to be carried out, the redefined vehicle action being a vehicle function that can be discerned by a driver of the vehicle, validating the digital signatures of vehicle-to-X messages (N_rel) relevant to the decision with regard to whether the predefined vehicle action is intended to be carried out;
   on the basis of a result of the validation of the digital signatures, providing a signal (S), which signal is representative of the reliability of the vehicle-to-X messages (N_rel) relevant to the decision; and
   validating the vehicle-to-X messages (N_tel) relevant to the decision,
   assigning an urgency to the predefined vehicle action and, on the basis of the assigned urgency of the predefined vehicle action, performing one selected from the group consisting of:
   (a) validating the vehicle-to-X messages (N_rel) relevant to the decision and generating the signal (S) while the predefined vehicle action of the application (30) is being carried out, subject to stopping the predefined vehicle action based on the generated signal (S), and
   (b) validating the vehicle-to-X messages (N_rel) relevant to the decision and generating the signal (S) before the predefined vehicle action of the application (30) is being carried out.

2. The method as claimed in claim 1, wherein the assigned urgency is predefined.

3. The method as claimed in claim 1, wherein the assigned urgency is determined on the basis of at least one of the vehicle-to-X messages (N_rel) relevant to the decision.

4. The method as claimed in claim 1, wherein the validation is considered to be concluded, and the signal (S) is provided, as soon as one of the vehicle-to-X messages (N_rel) relevant to the decision is classified as being unreliable.

5. The method as claimed in claim 1, wherein the vehicle-to-X messages (N_rel) relevant to the decision are validated on a random basis if a total number of vehicle-to-X messages (N_rel) relevant to the decision exceeds an upper limit value.

6. The method as claimed in claim 1, wherein, on the basis of a number of vehicle-to-X messages (N) received in a predefined period of time, the digital signature of one or more specific vehicle-to-X messages (N_spe) is validated before it/they is/are respectively assigned to the at least one application (30), the respective vehicle-to-X message (N) being classified as a specific vehicle-to-X message (N_spe) on the basis of at least one predefined criterion.

7. The method as claimed in claim 1, wherein, if a plurality of decision signals (D) are provided at the same time or within a predefined period of time,
   an action priority is respectively determined for the respective vehicle action on the basis of predefined rules, and
   the respective vehicle-to-X messages (N_rel) for the vehicle actions relevant to the decision are validated on the basis of the respectively determined action priorities.

* * * * *